US012209794B2

(12) United States Patent
Ha et al.

(10) Patent No.: US 12,209,794 B2
(45) Date of Patent: Jan. 28, 2025

(54) REFRIGERATOR

(71) Applicant: LG ELECTRONICS INC., Seoul (KR)

(72) Inventors: Seungpyo Ha, Seoul (KR); Tae Hoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 18/102,434

(22) Filed: Jan. 27, 2023

(65) Prior Publication Data

US 2023/0243574 A1 Aug. 3, 2023

(30) Foreign Application Priority Data

Jan. 28, 2022 (KR) ........................ 10-2022-0013493

(51) Int. Cl.
*F25D 23/02* (2006.01)
*E05B 1/00* (2006.01)

(52) U.S. Cl.
CPC .......... *F25D 23/028* (2013.01); *E05B 1/0015* (2013.01)

(58) Field of Classification Search
CPC .... F25D 23/028; F25D 23/02; F25D 2323/02; F25D 2400/18; F24C 15/024; F24C 15/04; F24C 15/02; F24C 15/045; E05B 1/0015; E05B 65/0042; E05B 65/0025; E05B 3/04; E05B 1/0053; A47B 95/02; A47B 2220/0047; A47B 95/04; A47F 3/0434; E05Y 2900/31
USPC ............................ 16/412, 413, 422, DIG. 24
See application file for complete search history.

(56) References Cited

U.S. PATENT DOCUMENTS

| | | | | |
|---|---|---|---|---|
| 3,017,657 A * | 1/1962 | Mills | F24C 15/024 | 16/443 |
| 5,740,587 A * | 4/1998 | Onai | E05B 1/0015 | 16/412 |
| 2011/0220662 A1* | 9/2011 | Kim | F25D 23/028 | 312/405 |
| 2012/0234993 A1* | 9/2012 | Byrne | F25D 23/028 | 248/201 |
| 2013/0285527 A1* | 10/2013 | Choi | F25D 23/00 | 312/405 |

(Continued)

FOREIGN PATENT DOCUMENTS

| | | |
|---|---|---|
| CN | 201748744 U * | 2/2011 |
| CN | 102383648 A * | 3/2012 |

(Continued)

OTHER PUBLICATIONS

KR20060039546 translation (Year: 2006).*

(Continued)

*Primary Examiner* — Hiwot E Tefera
(74) *Attorney, Agent, or Firm* — KED & ASSOCIATES, LLP

(57) ABSTRACT

A refrigerator includes a cabinet defining a storage chamber; and a door coupled to a front of the cabinet and to open and close the cabinet. The door may include a door handle; a door glass in contact with the door handle; a side decorative portion to which the door glass is adhered; door bracket coupled to the side decorative portion; and handle fastening means to fasten the door handle and the door bracket to each other.

16 Claims, 11 Drawing Sheets

(56) References Cited

U.S. PATENT DOCUMENTS

| | | | | |
|---|---|---|---|---|
| 2014/0208657 A1* | 7/2014 | Kim | F25D 23/02 | 49/460 |
| 2014/0338152 A1* | 11/2014 | Moody | E05B 1/0015 | 16/412 |
| 2015/0115785 A1* | 4/2015 | Allen | E05B 65/0042 | 312/319.2 |
| 2015/0159936 A1* | 6/2015 | Oh | F25D 23/028 | 312/405 |
| 2016/0084567 A1* | 3/2016 | Fernandez | F25D 23/028 | 312/405 |
| 2019/0277055 A1* | 9/2019 | Rogel | E06B 3/4636 | |
| 2020/0217515 A1* | 7/2020 | Wantland | F24C 15/024 | |

FOREIGN PATENT DOCUMENTS

| | | | | |
|---|---|---|---|---|
| CN | 205330279 | U * | 6/2016 | |
| CN | 106401285 | A * | 2/2017 | |
| DE | 102009027731 | A1 * | 2/2010 | A47B 95/02 |
| DE | 102011087757 | A1 * | 6/2013 | E05B 1/0015 |
| EP | 2385330 | A2 * | 11/2011 | F25D 23/028 |
| KR | 200416787 | Y1 * | 5/2006 | |
| KR | 20060039546 | A * | 5/2006 | |
| KR | 100828325 | B1 * | 5/2008 | |

OTHER PUBLICATIONS

KR100828325 translation (Year: 2008).*
CN201748744U translation (Year: 2011).*
CN-205330279-U translation (Year: 2016).*

* cited by examiner

REFRIGERATOR

CROSS-REFERENCE TO RELATED APPLICATION(S)

This application claims priority to and the benefit of Korean Patent Application No. 10-2022-0013493, filed in Korea on Jan. 28, 2022, the disclosure of which is incorporated herein by reference in its entirety.

BACKGROUND

1. Field

The present disclosure relates to a refrigerator, more particularly, a refrigerator including a handle attached a glass surface of a refrigerator door.

2. Background

A refrigerator is a home appliance to keep various kinds of storage targets fresh for a long time in the storage compartment by supplying cold air generated by refrigerant circulation. Such a refrigerator is provided with one or a plurality of storage compartments partitioned off to freeze and refrigerate storage targets. The storage compartment may be a storage compartment that is opened and closed with a rotary door, or a storage compartment that is taken out or stored in a drawer type.

In particular, the storage compartment may include a freezer compartment for freezing storage targets and a refrigerator compartment for refrigerating storage targets. Two or more freezer compartments or two or more refrigerator compartments may be provided.

Recently, a front surface of the door is made of glass for aesthetics of the refrigerator compartment door. However, a door handle cannot be directly attached to the glass surface but to a horizontal edge of the door. Due to this structure, there is a problem of low usability.

BRIEF DESCRIPTION OF THE DRAWINGS

The embodiments will be described in detail with reference to the following drawings in which like reference numerals refer to like elements wherein.

DETAILED DESCRIPTION

Figure 1:
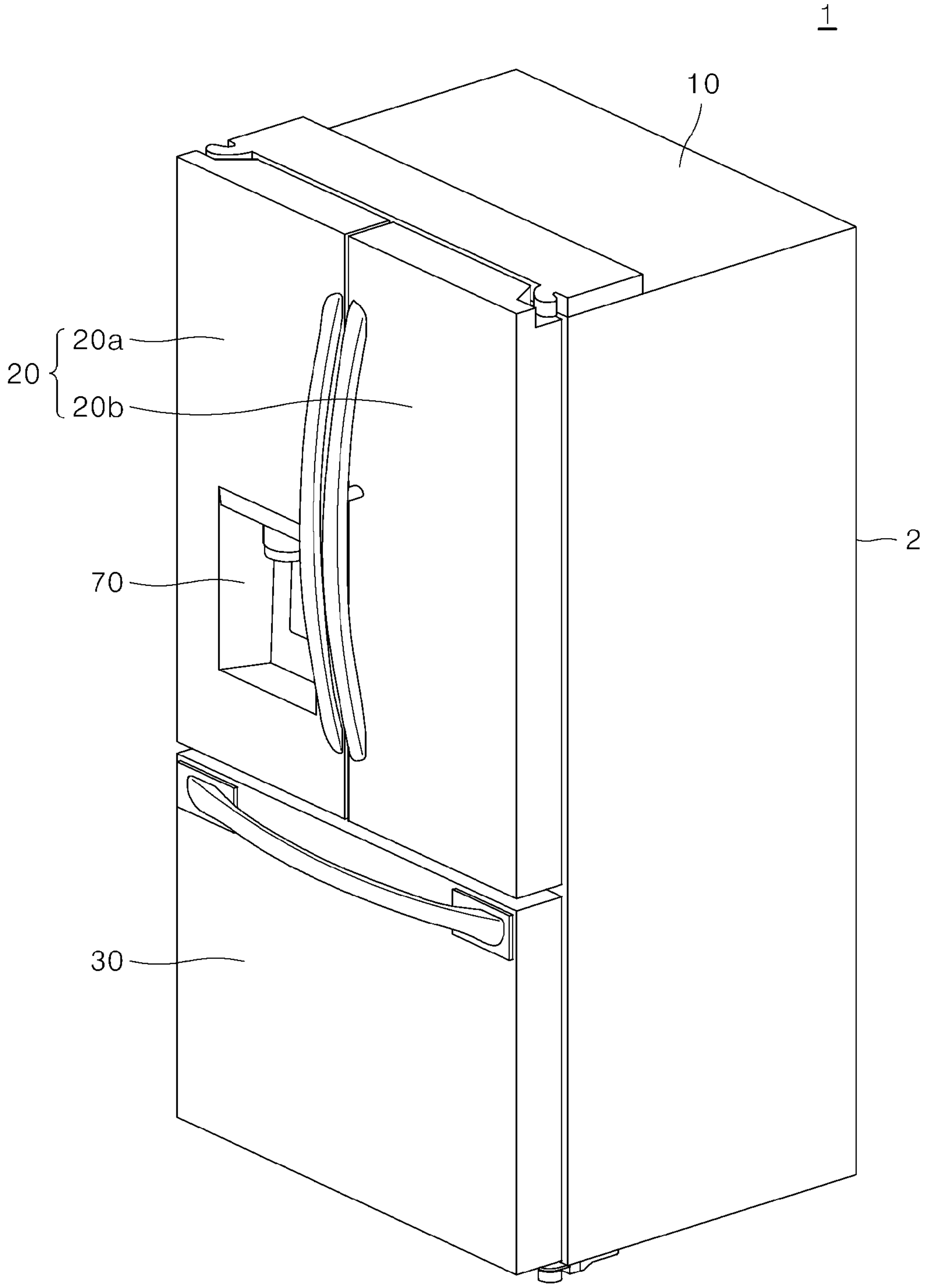
FIG. 1 is a front perspective view of a refrigerator according to an embodiment.

The below-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary. Throughout the disclosure, each component can be provided as a single one or a plurality of ones, unless explicitly stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. Throughout the disclosure, the terms "A and/or B" as used herein can denote A, B or A and B, and the terms "C to D" can denote C or greater and D or less, unless stated to the contrary.

Figure 2:
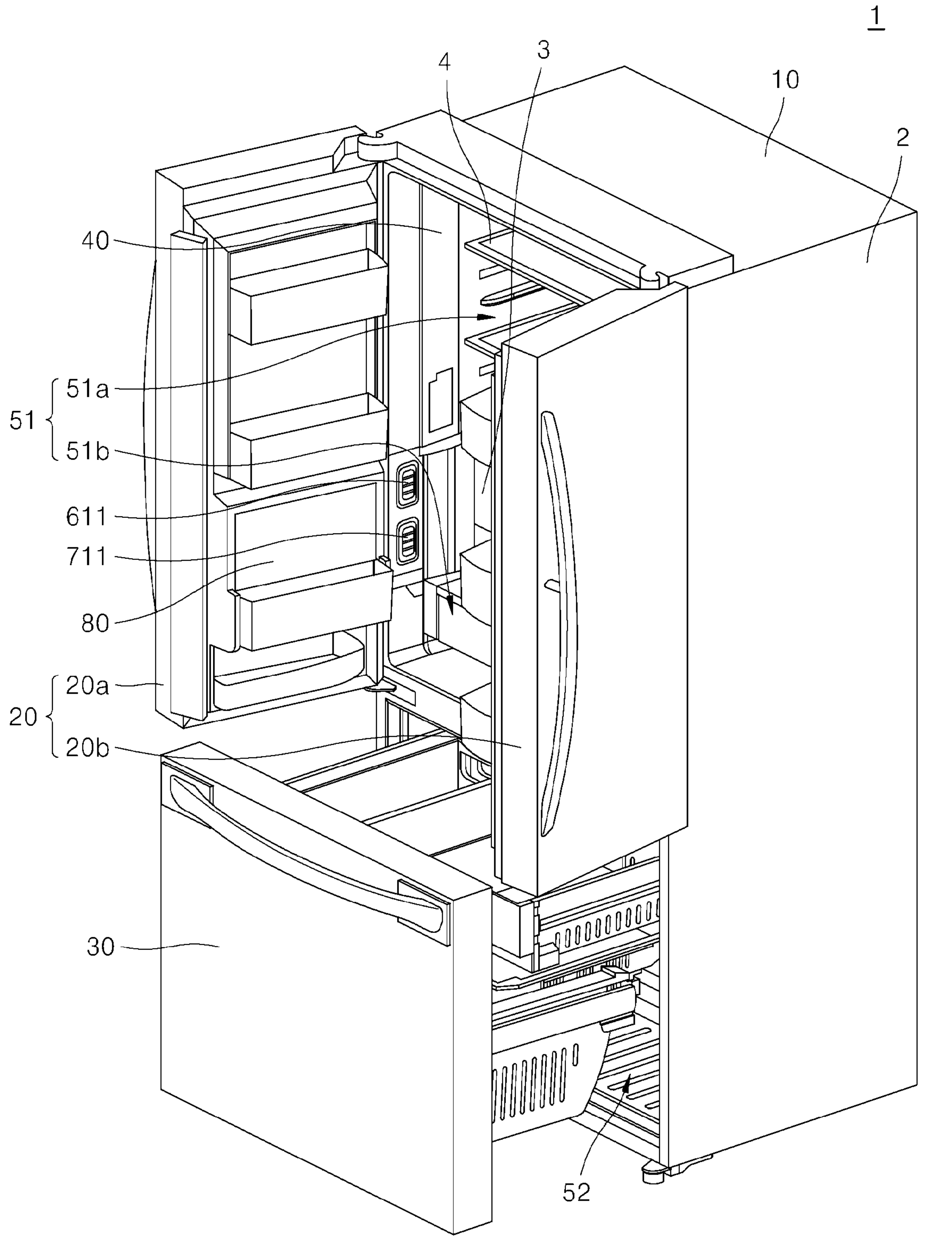
FIG. 2 is a front perspective view of a refrigerator according to an embodiment in a state where a door is open.

Hereinafter, a refrigerator according to an embodiment will be described. FIG. 1 is a front perspective view of a refrigerator according to an embodiment. FIG. 2 is a front perspective view of a refrigerator according to an embodiment in a state where a door is open.

An exterior design of the refrigerator 1 may be defined by a cabinet 1 defining a storage space and a door to open and close an open front of the cabinet 2. The door 20, 30 may be coupled to a front of the cabinet 2 to open and close the cabinet 2.

The cabinet 2 may include an outer case 10 forming an outer surface of the refrigerator 1 and an inner case 40 forming an inner surface of the outer case 10. The outer case 10 and the inner case 40 may be spaced a preset distance apart from each other and an insulating material is foamed in the space between them to fill the empty space with the insulating material.

A storage space inside the cabinet 2 may be divided into a plurality of spaces, which are a refrigerator compartment 51 and a freezer compartment 52. As one embodiment of the present disclosure, the freezer compartment 52 may be mounted in a lower space of the cabinet 2 and the refrigerator compartment 51 may be mounted in an upper space.

A door may be coupled to a front surface of the cabinet 2 to open and close the refrigerator 1. An upper door 20 may be coupled to a front surface corresponding to the refrigerator compartment 51 and a lower door 30 may be coupled to a front surface corresponding to the freezer compartment 52. For example, the upper door 20 may be a rotation type configured of a first upper door 20 and a second upper door 20*b* that are rotatable on shafts on both sides of the cabinet 2, respectively. The lower door 30 may be a drawer type to slide inward or outward along a rail.

A dispenser 70 may be disposed in the first upper door 20*a* to discharge water or ice even when the door is not opened. An ice-making chamber 22 may be disposed in the first upper door 20*a* in which the dispenser 70 is provided, and may make ice.

On an inner surface of the inner case 40 connected to the first upper door 20*a* may be formed a supply duct outlet hole 611 for supplying cold air to the ice-making chamber 80 and a returning duct inlet hole 711 for returning the cold air of the ice-making chamber 80. The supply duct outlet hole 611 and the returning duct inlet hole 711 may be in communication with one surface of the ice-making chamber 22, in a state where the first upper door 20*a* is closed.

The refrigerator compartment 51 may be divided into a first storage chamber 51*a* and a second storage chamber 51*b*. The second storage chamber 51*b* may be a pantry room that may control the temperature to accommodate a specific storage target such as vegetables or meat.

The first storage chamber 51*a* may refer the other space of the refrigerator compartment 51, except the second storage chamber 51*b*, and may be a main storage space. For example, the second storage chamber 51*b* may be disposed below the first storage chamber 51*a*, and may be partitioned off as a separate space from the first storage chamber 51*a* by a partitioning member.

A storage drawer 3 may be provided in the second storage chamber 51*b* to slide outward and inward along a rail. In addition, a storage drawer 3 or a shelf 4 may be provided in the first storage chamber 51*a* to easily keep or preserve fresh storing targets. Separate temperature sensors may be provided in the first storage chamber 51*a* and the second storage chamber 51*b*, respectively, to independently adjust and keep different temperatures.

Figure 3:
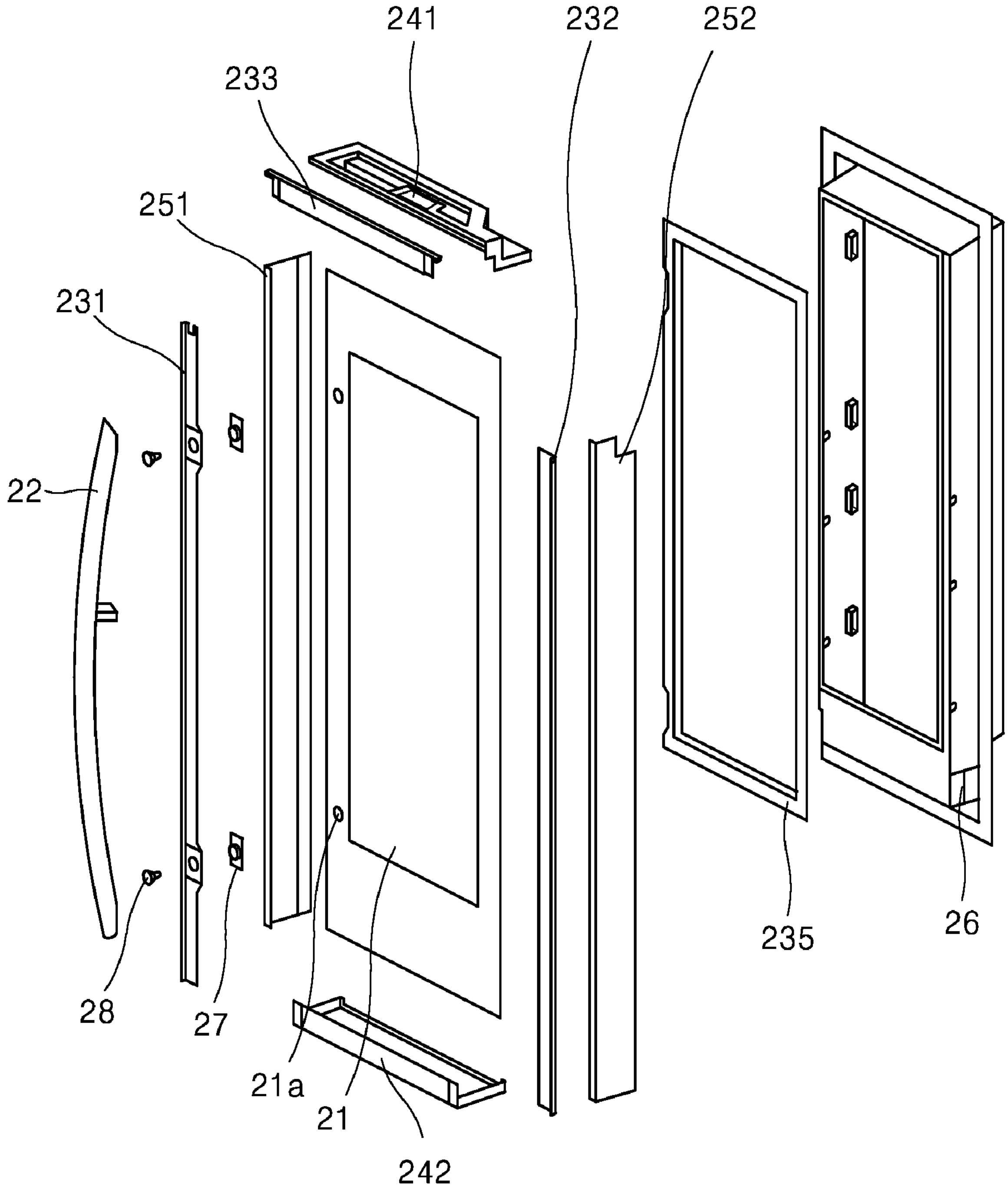
FIG. 3 is an exploded perspective view of a refrigerator door according to an embodiment.
Figure 4:
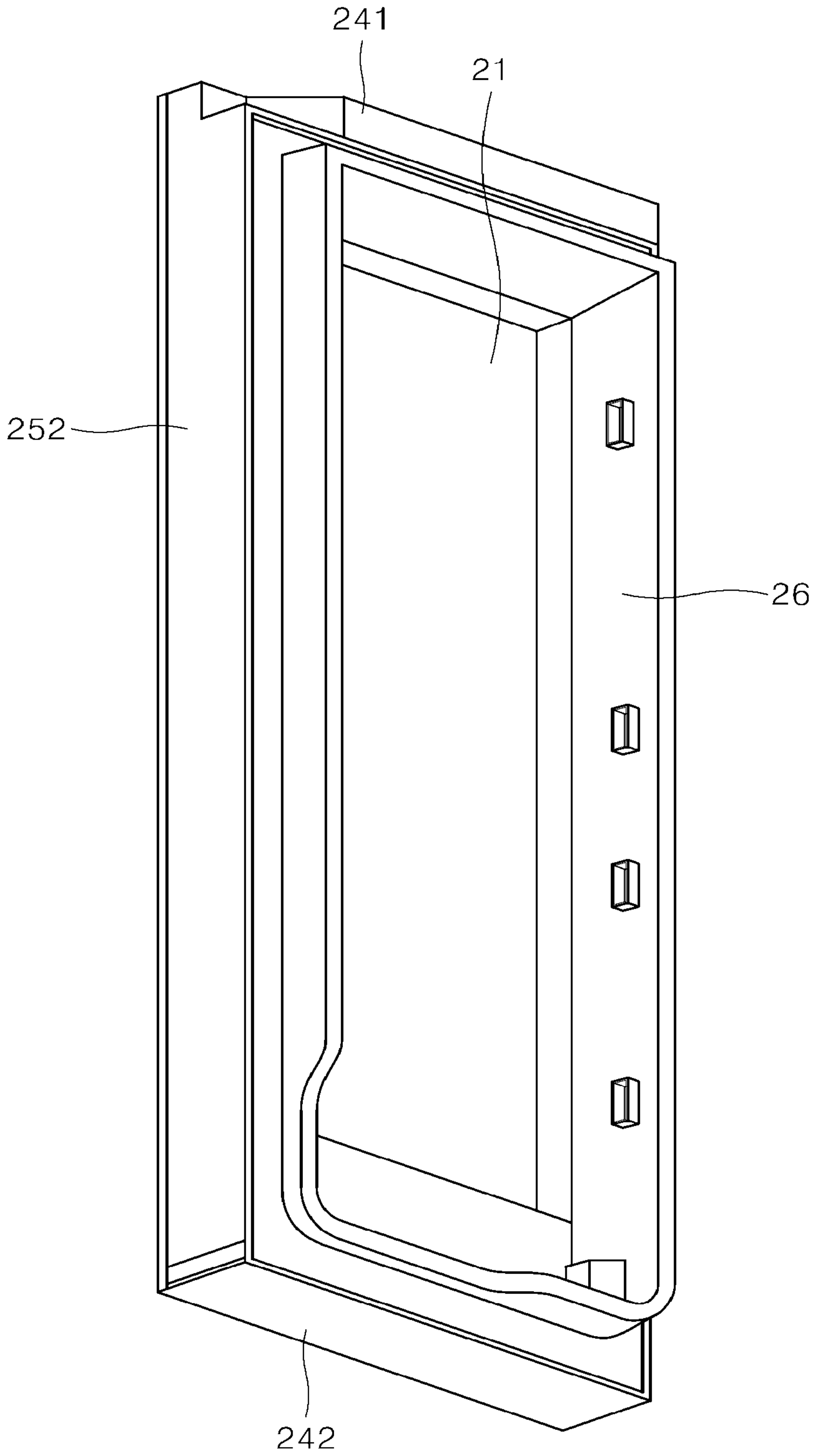
FIG. 4 is a perspective view of a refrigerator door according to an embodiment.

FIG. 3 is an exploded perspective view of a refrigerator door according to an embodiment. FIG. 4 is a perspective view of a refrigerator door according to an embodiment. The door 20, 30 according to the embodiment may include a door handle 22, a door glass (or glass panel) 21 in contact with the door handle 22, a first side decorative portion (also referred to herein as a first side decorative frame or a first side decorative plate) 231 to which the door glass 21 is attached, a second side decorative portion (or second side decorative frame) 232, an upper decorative portion (or upper decorative frame) 233, a door bracket 27 coupled to the side decorative portion 231, a first lateral plate member 251 and a second lateral plate member 252 that define side exteriors of the door, an upper decorative cap 241 and a lower decorative cap 242 that define upper and lower outer exteriors, an inner decorative portion (or inner decorative frame) 235 attached to an inner surface of the door glass 21, a door liner 26 defining a space filled with the foam insulating material, and handle fastening means (or handle fasteners) 28 and 29 for fastening the door handle 22 and the door bracket 27 to each other.

The door 20 and 30 may be one of a first upper door 20*a*, a second upper door 20*b* and a lower door 30. In this embodiment, the door 20 and 30 may be the second upper door 20*b* that is rotary type without the dispenser 70.

The door handle 22 may be formed to be held by the user to rotate the door 20 and 30. The door handle 22 may be formed in a vertically long bar shape with a center formed in a bow shape so that the user can grip the center thereof.

The door handle 22 may be biased to one side along a rotation direction of the door 20 and 30. The door handle 22 may be attached to an outer surface of the door glass 21, not being directly fastened thereto. The door handle 22 may be fastened to the door bracket 27 by using handle fastening means 28 and 29.

The door glass 21 may form the front exterior of the door 20 and 30. The door 20 and 30 may have the door glass 21 disposed on an entire area of the front surface. The door glass 21 may be formed of double-layer insulating glass to minimize temperature loss of cold air. Both lateral edges and an upper edge of a rear surface of the door glass 21 may be adhered to front surfaces of the first side decorative portion 231, the second side decorative portion 232 and the upper decorative portion 233 by using double-sided tape or an adhesive. The inner decorative portion 235 and/or the door liner 26 may be disposed on the rear surface of the door glass 21.

The door glass 21 may have an open door glass hole 21*a*. The door glass hole 21*a* may be provided in an area where the door bracket 27 is disposed. When the door bracket 27 is provided in plural, the door glass hole 21*a* may be also provided in plural.

The first side decorative portion 231 and the second side decorative portion 232 may be formed in a vertically long bar shape, and may be adhered to both ends of the door glass 21 to support the door glass 21, respectively. The side decorative portion 231 and the second side decorative portion 232 may be formed of synthetic resin so that there is no problem even if the decorative portions is in tight contact with the door glass 21.

The upper decorative portion 233 may be formed in a horizontally long bar shape and adhered to an upper end of the door glass to support the door glass 21. The upper decorative portion 233 may be formed of synthetic resin so that there is no problem even if the upper decorative portion is in tight contact with the door glass 21.

The first lateral plate member 251 and the second lateral plate member 252 may be formed in a vertically long bar shape. The first lateral plate member 251 and the second lateral plate member 252 may be coupled to the first side decorative portion 231 and the second side decorative portion 232, respectively, to define the lateral side exterior of the door 20 and 30. The first lateral plate member 251 and the second lateral plate member 252 may be made of metal not to be in direct contact or coupled to the door glass 21.

The upper decorative cap 241 may be coupled to the upper decorative portion 242 to define a lower surface exterior of the door 20 and 30. The upper decorative cap 241 and the lower decorative cap 242 may include a hinge for rotating the door 20 and 30.

The inner decorative portion 235 may secure an inner periphery of the door liner 26 to the door glass 21. The door liner 26 may be formed of an elastic material to seal between the door 20 and 20 and the cabinet 2.

A foam insulating material may be foamed and filled in a space formed between the door liner 26, the door glass 21, the first lateral plate member 251 and the second lateral plate member 252. The foam insulating material may prevent the cold air inside the storage chamber from being heat-transferred to the outside, and may couple the first side decorative portion 231 to the first lateral plate member, the second side decorative portion 232 to the second lateral plate member 252, and the upper decorative portion 233 to the upper decorative member 241.

The door bracket 27 may be not in direct contact with the door glass 21 but be coupled to the door handle 22 by using the handle fastening means 28 and 29. The door bracket 27 may be made of a metal material having rigidity. The door bracket 27 may be disposed in the first side decorative portion 231 or the second side decorative portion 232 along a rotation direction of the door 20 and 30. In the embodiment, the door bracket 27 may be disposed in the first side decorative portion 231.

The door bracket 27 may be coupled to a hook formed in the first side decorative portion 231. A plurality of door brackets 27 may be provided in the first side decorative portion 231, spaced apart from each other in a vertical direction.

Figure 5:
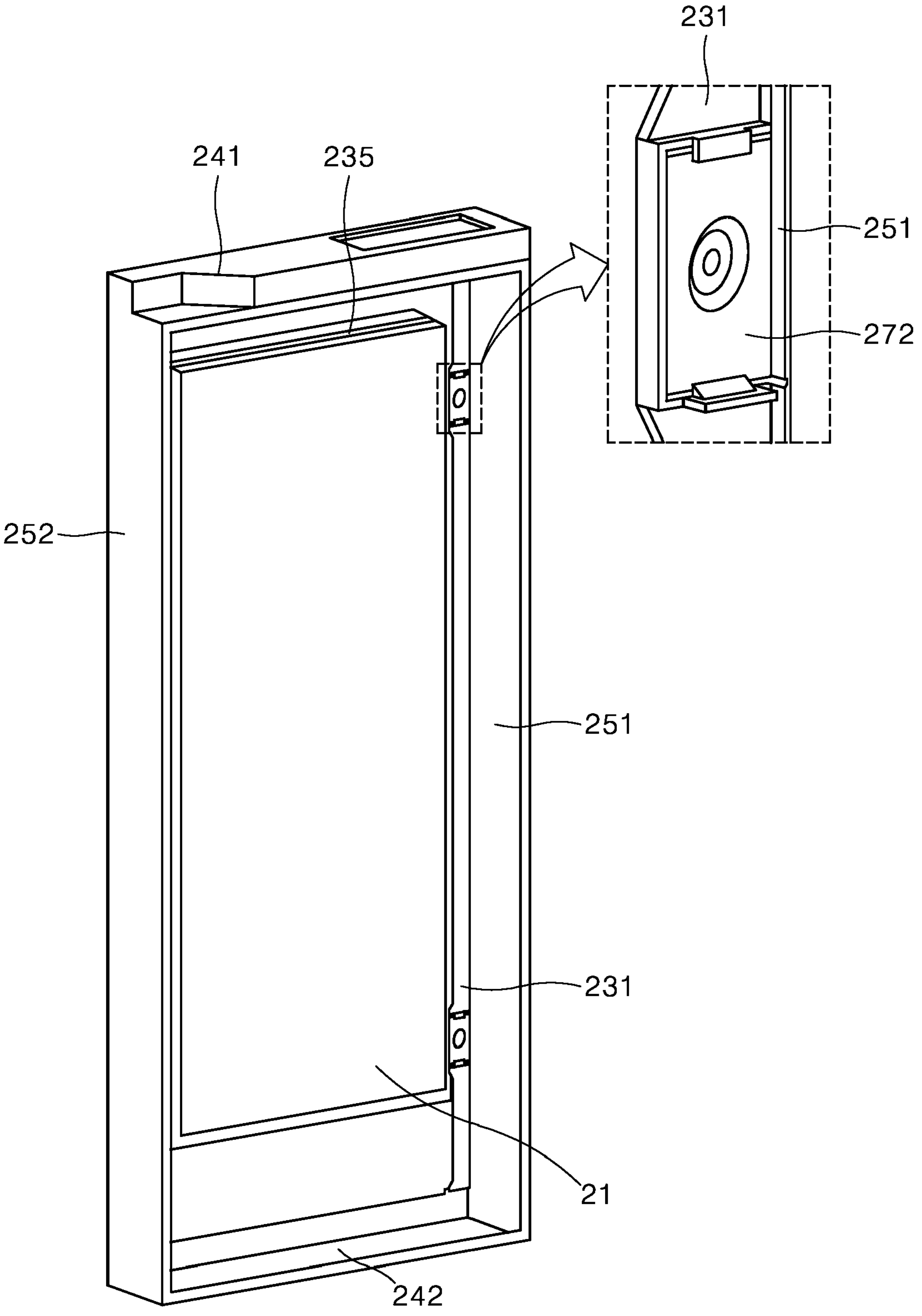
FIG. 5 is a perspective view showing part of a refrigerator door according to an embodiment.
Figure 6:
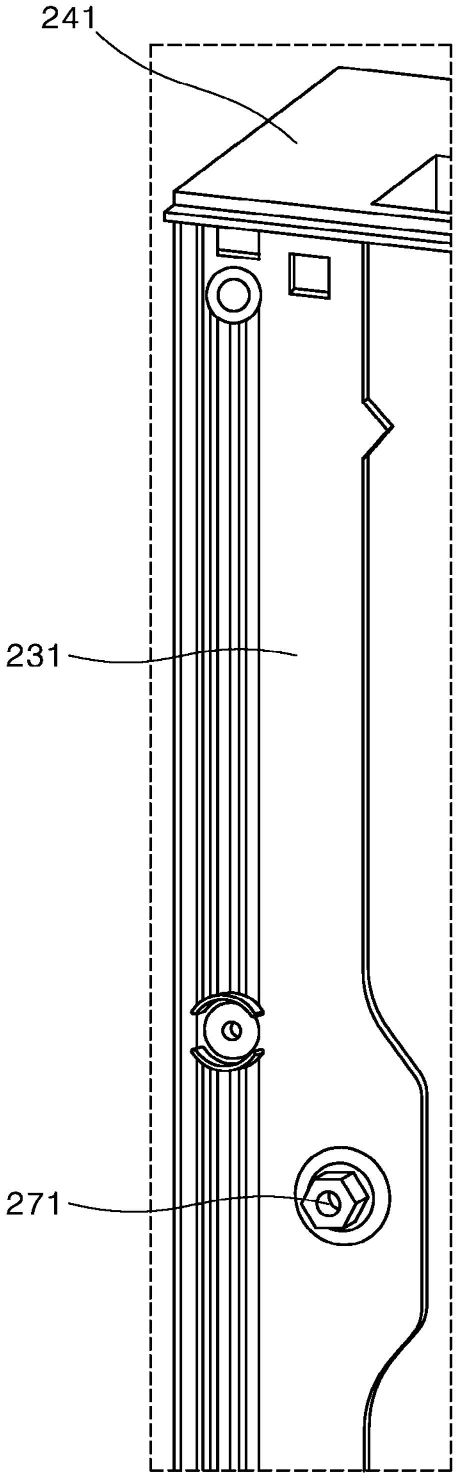
FIG. 6 a perspective view partially showing a refrigerator door according to an embodiment.
Figure 7:
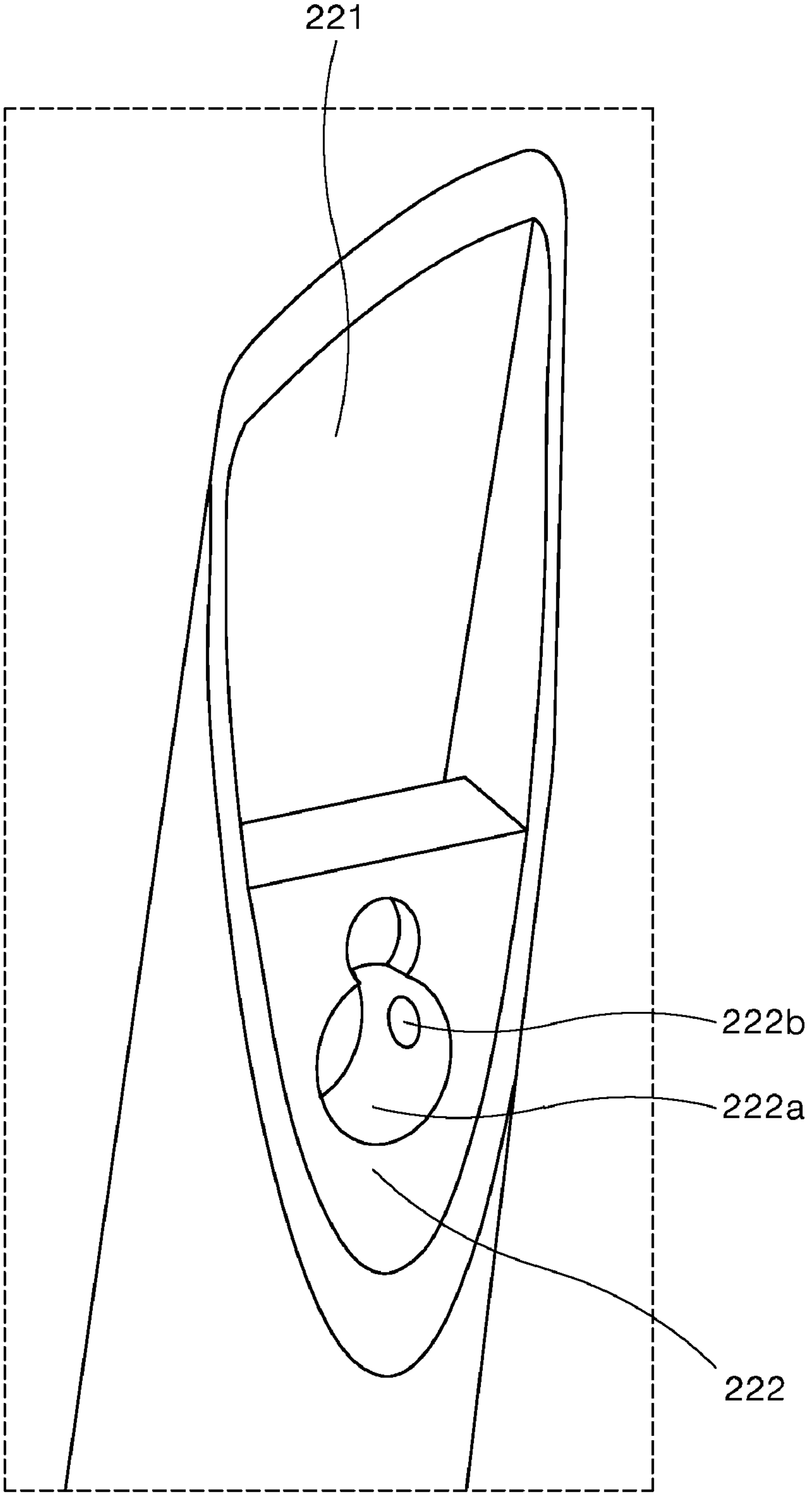
FIG. 7 is a perspective view partially showing a door handle of a refrigerator according to an embodiment.
Figure 8:
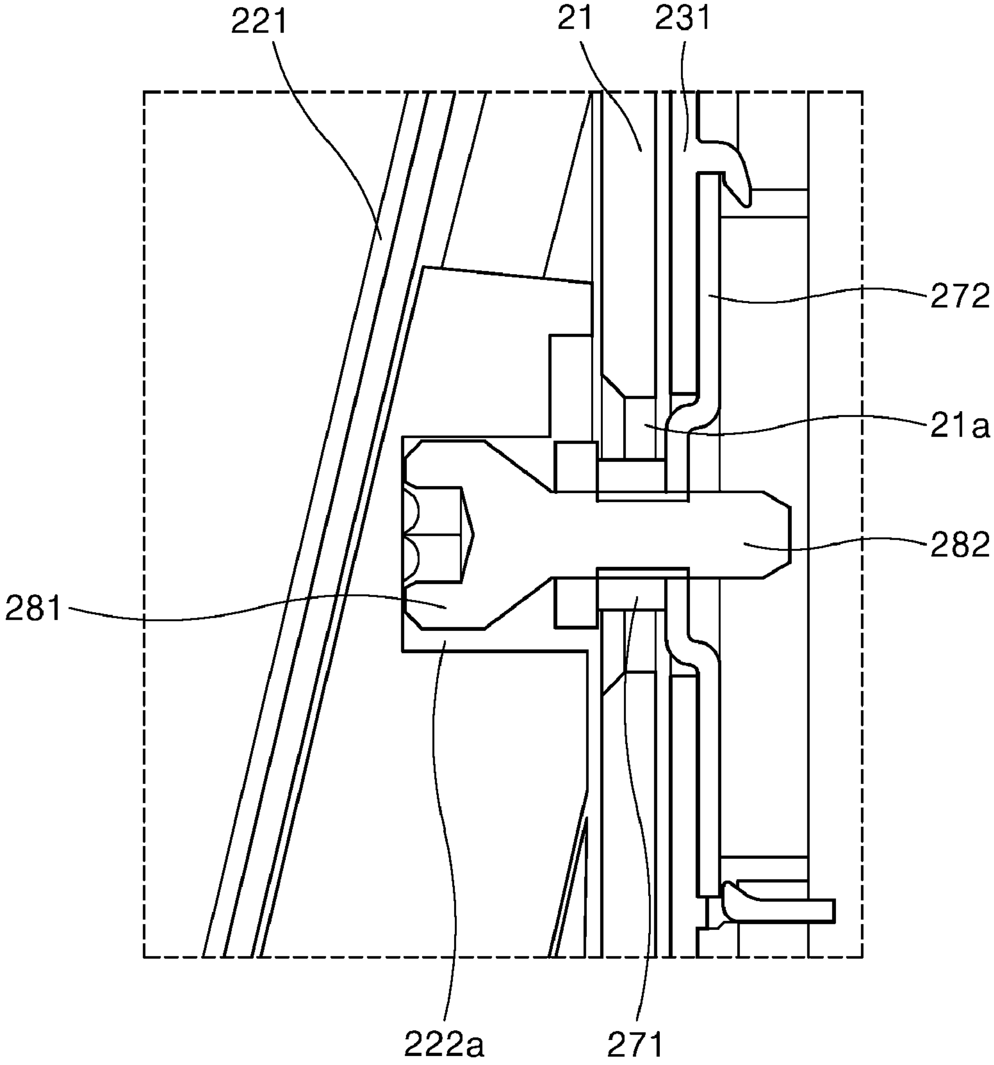
FIGS. 8 and 9 are sectional views partially showing a door of a refrigerator according to an embodiment.
Figure 9:
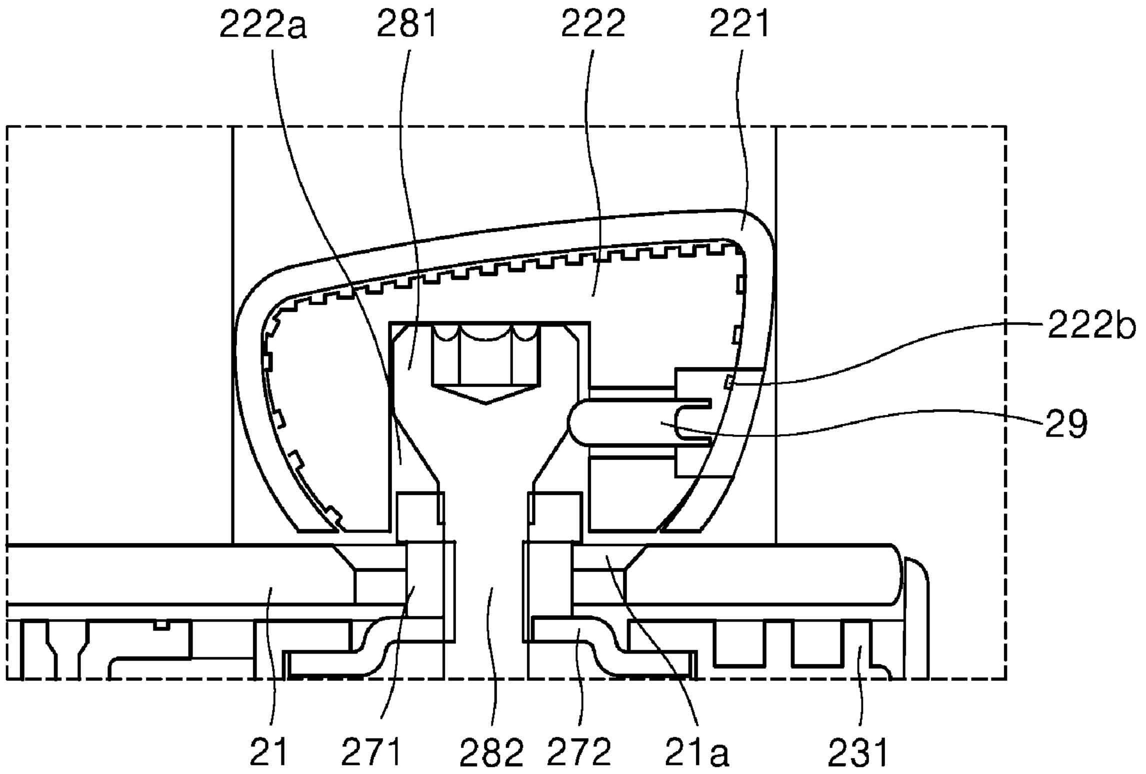

FIG. 5 is a perspective view showing part of a refrigerator door according to an embodiment. FIG. 6 a perspective view partially showing a refrigerator door according to an embodiment. FIG. 7 is a perspective view partially showing a door handle of a refrigerator according to an embodiment. FIGS. 8 and 9 are sectional views partially showing a door of a refrigerator according to an embodiment.

The door bracket 27 may include a bracket base 272 and bracket fastening means (or a bracket fastener) 271 joint to the bracket base 272 to be fastened to the handle fastening means 28 and 29. The bracket base 272 may be formed in a rectangular plate shape and the bracket fastening means 271 may be joined to a center of one surface of the bracket base 272. The bracket base 272 and the bracket fastening means 271 may be welded to each other. The bracket base 272 may not be in contact with the door glass 21, and the first side decorative portion 231 may be disposed between bracket base 272 and the door glass 21.

At least predetermined area of the bracket fastening means 271 may be spaced apart from the door glass 21 to be disposed in a door glass hole 21*a*. The bracket fastening means 271 may not be in contact with the door glass 21.

The bracket fastening means 271 may be just various means to be fastened to the handle fastening means 28. In this embodiment, the bracket fastening means 271 may be realized as a bracket nut 271 having a thread in a hole. The bracket nut 271 may be disposed in the door glass hole 21*a*, spaced apart from the door glass.

The handle fastening means 28 and 29 may fasten the door handle 22 and the door bracket 27 to each other in order to attach the door handle 22 to the door glass 21. The handle fastening means 28 and 29 may be various means to be fastened to the bracket fastening means 271. In this embodiment, the handle fastening means 28 and 29 may include a handle bolt (or first handle fastener) 28 fastened to the bracket nut 271, and a second handle fastener 29 provided to fasten the handle bolt 28 to the door handle 22. The handle bolt 28 may include a head 281 and a screw 282.

The door handle 22 according to an embodiment may include a door handle outer portion (or handle cover) 221 defining an exterior of the door handle 22, and a door handle inner portion (or handle core) 222 disposed inside the door handle outer 221 to provide rigidity.

The door handle outer portion 221 may be made of a synthetic resin that is easy to process. The door handle inner portion 222 may be made of a metal material to provide rigidity to the door handle 22. The door handle outer portion 222 may be an exterior decoration, and the area that substantially receives the user's force when opening and closing the door 20 and 30 may be the door handle inner portion 222. The door handle inner portion 222 may be coupled to the door bracket 27 by using the handle fastening means 28 and 29.

The door handle inner portion 222 may include a head hole 222*a* in which the head 281 of the handle bolt 28 is inserted, and a fastener hole 222*b* in which the second handle fastener 29 is inserted. Opening directions of the head hole 222*a* and the fastener hole 222*b* may be formed perpendicularly.

The second handle fastener 29 may be inserted in the fastener hole 222*b* to be fastened in a direction perpendicular to the direction in which the door handle 22, the door glass 21, the first side decorative portion 231 and the door bracket 27 are disposed. The handle fastener may be the means substantially fastening the door handle 22 to the door bracket 27. Since the handle fastener 29 is fastened in the direction perpendicular to the direction in which the second handle fastener 29 and the door glass 21 are fastened to each other, damage to the door glass 21 may be prevented. The second handle fastener 29 may be inserted in the fastened hole 222*b* and fastened by applying a force to the head hole 222*a* of the handle bolt 28 in the direction perpendicular to the direction, in which the door handle 22, the door glass 21, the first side decorative portion 231 and the door bracket 27 are disposed.

The door glass 21 may be not in direct contact with the door bracket 27 and the handle fastening means 28 and 29, which are made of a metal material. Accordingly, the area of the door glass to which the door handle 22 is fastened may not become weak.

Referring to FIGS. 7 and 8, the door handle 22, the door glass 21, the first side decorative portion 231 and the door bracket 27 may be sequentially disposed as multi-layers. The handle bolt 28 that is the handle fastening means 28 and 29 may pass through the door glass 21, the first side decorative portion 231 and the door bracket 27. When it is foamed, the foam insulating material filled in the side decorative portion 231 may be prevented from passing through the door glass hole 21*a* by the handle fastening means 28 and 29.

According to embodiments, the bracket fastening means 271 may be a nail-shaped bracket post protruding in a direction toward the door handle 22. The bracket post may pass through the door glass hole 21*a*, spaced apart the door glass. The bracket post may be a combination of the handle bolt 28 and the bracket base 272, and may be joined to the bracket base 272. In this instance, the handle fastening means 29 may be the second handle fastener 29 so that the second handle fastener 29 may apply a force to a head of the bracket post to be fastened.

Figure 10:
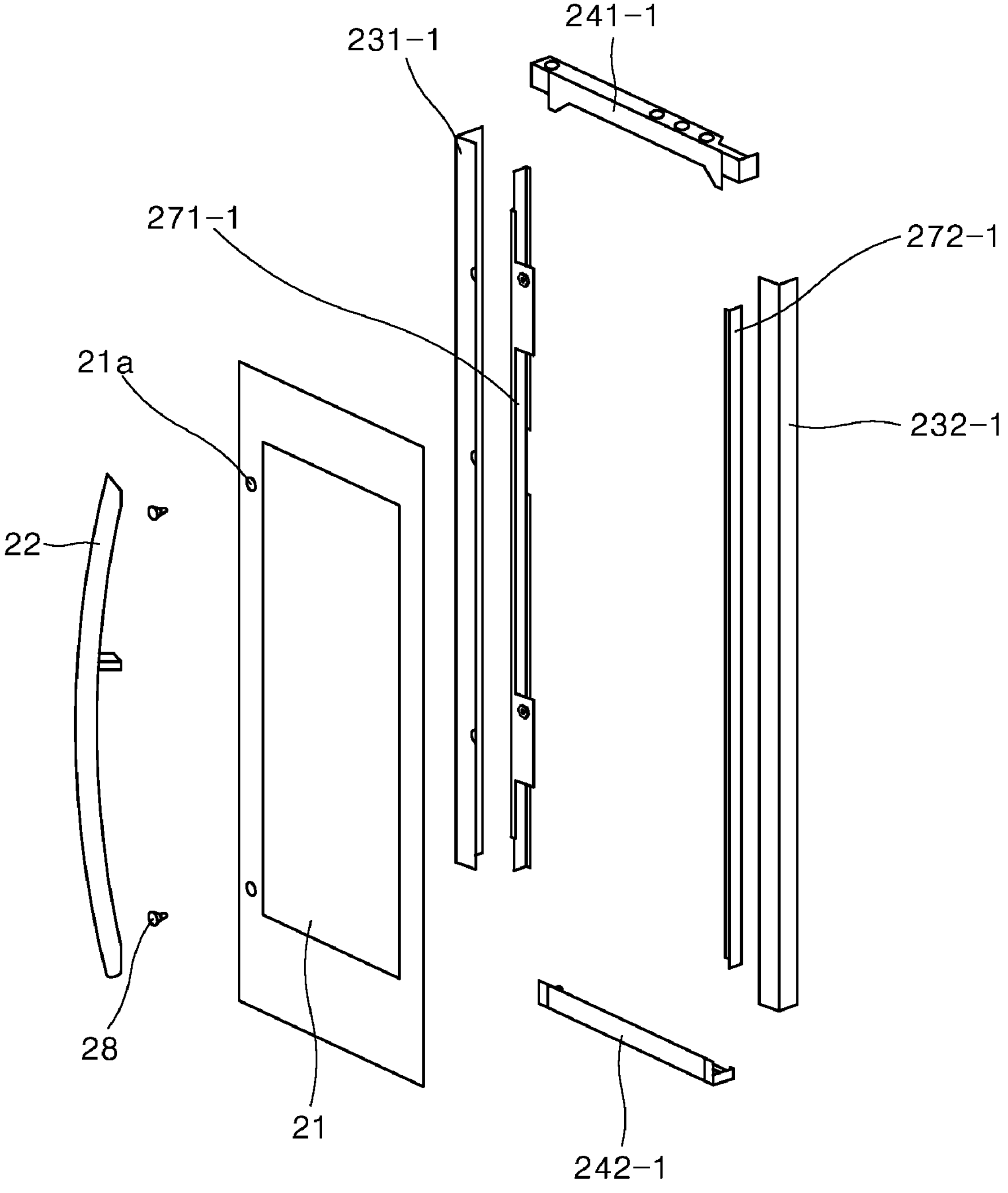
FIG. 10 is an exploded perspective view showing a door of a refrigerator according to an embodiment.
Figure 11:
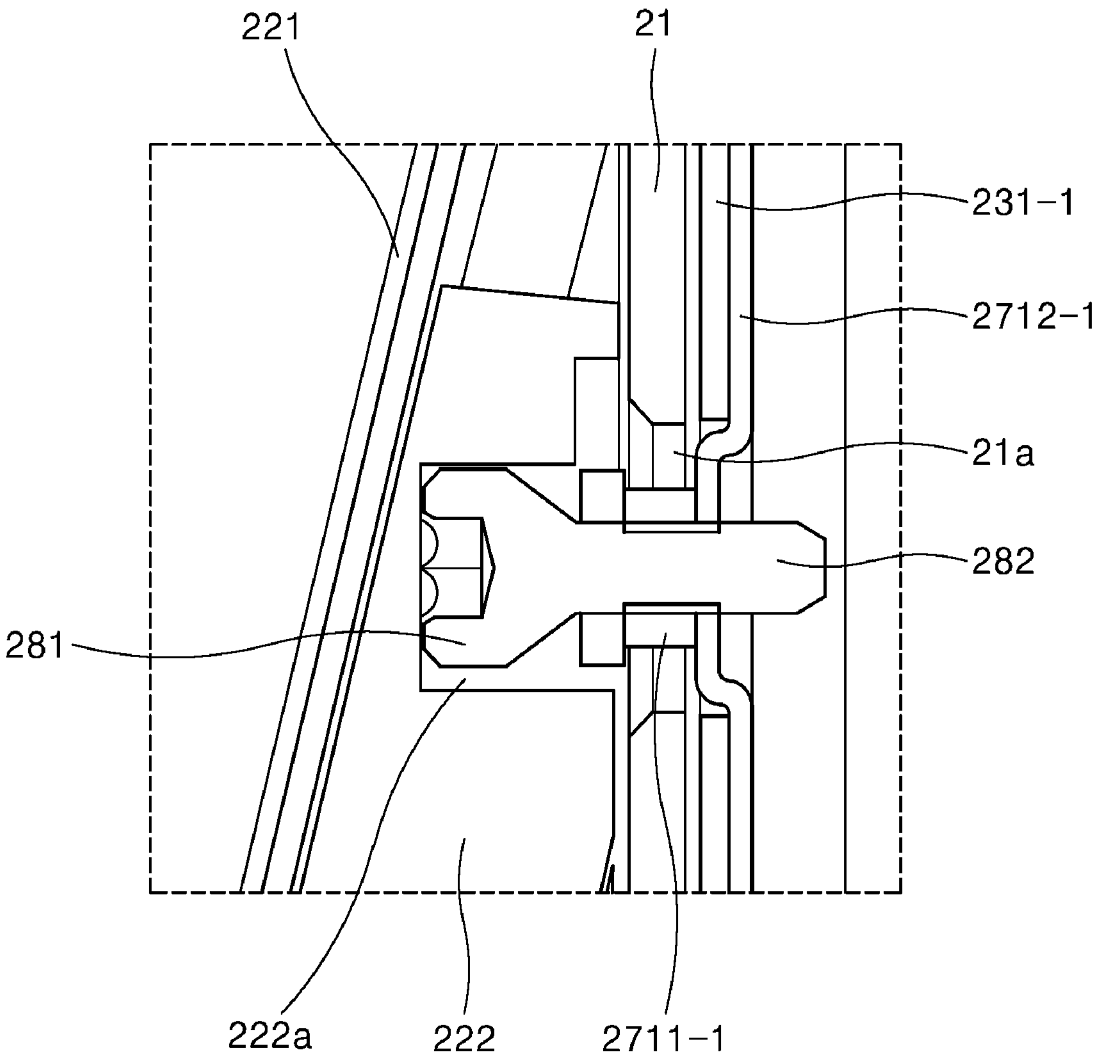
FIG. 11 is a sectional view partially showing a door of a refrigerator according to the embodiment.

FIG. 10 is an exploded perspective view showing a door of a refrigerator according to an embodiment. FIG. 11 is a sectional view partially showing a door of a refrigerator according to the embodiment. The door 20 and 30 according to an embodiment may include a first side decorative portion 231-1 defining a lateral surface exterior of the door and having the door glass 21 to be attached thereto, a second side decorative portion 232-1, an upper decorative cap 241-1 and a lower decorative cap 242-1.

The first side decorative portion 231-1 and the second side decorative portion 232-1 may be made of a synthetic resin, and may have no separate lateral plate members. Accordingly, a first door bracket 271-1 and a second door bracket 272-1, which are made of a metal material, may be formed in a vertically long bar shape, to provide rigidity to the first side decorative portion 231-1 and the second side decorative portion 232-1.

Bracket fastening means (or bracket fastener) 2711-1 may be provided in the first door bracket 272-1 or the second door bracket 272-1. In this embodiment, the first door bracket 272-1 may include a first bracket base 2712-1 and bracket fastening means 2711-1.

Referring to FIG. 10, in this embodiment, a door handle 22 may be coupled to the first door bracket 271-1, which is substantially the same as the technical feature of the above-described embodiment. The door handle 22, the door glass 21, the first side decorative portion 231-1 and the first door bracket 271-1 may be disposed sequentially, and the handle fastening means 28 may be fastened to the bracket fastening means 2711-1, to couple the door handle 22 to the first door bracket 271-1 and adhere the door handle 22 to the door glass 21.

One aspect of the present disclosure is to provide a refrigerator including a handle attached to a front surface of a refrigerator compartment that is made of glass. Aspects according to the present disclosure are not limited to the above ones, and other aspects and advantages that are not mentioned above can be clearly understood from the above description and can be more clearly understood from the embodiments set forth herein.

To solve the above-noted objects, a refrigerator according to an embodiment may include a cabinet defining a storage chamber; and a door coupled to a front of the cabinet to open and close the cabinet. The door may include a door handle; a door glass in contact with the door handle; a side decorative portion to which the door glass is adhered; door bracket coupled to the side decorative portion; and handle fastening means to fasten the door handle and the door bracket to each other. Detailed descriptions of other embodiments are provided in description of embodiments and drawings above.

The refrigerator according to the present disclosure may have one or more of following effects. First, the handle may be adhered to the glass surface and the refrigerator may have an advantageous effect of increased usability. Second, the refrigerator may have another advantageous effect of no fear of breaking the glass when the handle is adhered to the glass surface of the door. Third, the refrigerator may have a further advantageous effect of preventing the foam insulating material from leaking through the glass hole for installing the handle. Finally, the refrigerator has a still further advantageous effect that the glass strength of the area where the handle is fastened is almost the same as that of the other areas. Specific effects are described along with the above-described effects in the section of Detailed Description.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as “lower”, “upper” and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as “lower” relative to other elements or features would then be oriented “upper” relative to the other elements or features. Thus, the exemplary term “lower” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to “one embodiment,” “an embodiment,” “example embodiment,” etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a cabinet defining a storage chamber; and
a door coupled to the cabinet to open and close the storage chamber,
wherein the door includes:
a handle;
a glass panel;
a side decorative frame attached to the glass panel;
a bracket coupled to the side decorative frame; and
a handle fastener to fasten the handle and the bracket to each other,
wherein the bracket includes:
a bracket base coupled to the side decorative frame; and
a bracket fastener joined to the bracket base and configured to be coupled to the handle fastener,
wherein the side decorative frame is disposed between the bracket base and the glass panel, and
wherein the glass panel includes a hole, and the bracket fastener passes through the hole of the glass panel and is spaced apart from the glass panel.

2. The refrigerator of claim 1, wherein:
the bracket fastener includes a bracket nut defining a hole having a thread and configured to receive and engage the handle fastener, and
the bracket nut is positioned in the hole of the glass panel and is spaced apart from the glass panel.

3. The refrigerator of claim 2, wherein:
the handle fastener is a first handle fastener,
the first handle fastener includes a handle bolt fastened to the bracket nut; and
the door includes a second handle fastener to fasten the handle bolt and the handle to each other.

4. The refrigerator of claim 3, wherein the handle includes,
a head hole in which a head of the handle bolt is inserted; and
a fastener hole in which the second handle fastener is inserted.

5. The refrigerator of claim 4, wherein the second handle fastener is configured to be inserted in the fastener hole and fastened by applying a force to the head of the handle bolt in a direction perpendicular to a direction in which the handle, the glass panel and the side decorative frame are positioned.

6. The refrigerator of claim 1, wherein the bracket fastener includes a bracket post protruding toward the handle, and
the bracket post passes through the hole of the glass panel and is spaced apart from the glass panel.

7. The refrigerator of claim 6, wherein the handle fastener is configured to fasten the bracket post and the handle to each other.

8. The refrigerator of claim 1, wherein:
the handle fastener is a first handle fastener, and
the door includes a second handle fastener fastened in a direction perpendicular to a direction in which the handle, the glass panel, and the side decorative frame are positioned.

9. The refrigerator of claim 1, wherein the bracket base is spaced apart from the glass panel.

10. The refrigerator of claim 1,
wherein the handle fastener and the bracket are configured to prevent foam insulating material provided at the side decorative frame from passing through the hole of the glass panel.

11. The refrigerator of claim 1, wherein the door includes:
a first side plate and a second side plate provide at respective sides of the glass panel;
an upper cap and a lower cap provided, respectively at upper and lower ends of the glass panel; and
a door liner provided at an inner side of the glass panel.

12. The refrigerator of claim 1, wherein the door bracket is coupled to a hook formed in the side decorative frame.

13. The refrigerator of claim 1, wherein the side decorative frame includes a first vertical surface extending attached to a side surface of the glass panel, and a second vertical surface attached to a rear surface of the glass panel.

14. The refrigerator of claim 1, wherein
the bracket includes an upper bracket and a lower bracket, and
the handle fastener includes:
an upper handle fastener that couples an upper end of the handle to the upper bracket, and
a lower handle fastener that couples a lower end of the handle to the lower bracket.

15. The refrigerator of claim 1, wherein:
the bracket vertically extends between an upper end of the handle and a lower end of the handle, and
the handle fastener includes:
an upper handle fastener that couples the upper end of the handle to an upper end of the bracket, and
a lower handle fastener that couples the lower end of the handle to a lower end of the bracket.

16. The refrigerator of claim 1, wherein:
the handle includes a handle core and a handle cover provided around to the handle core to define an exterior of the handle, and
the handle core includes a head hole to receive a head of the handle fastener.

* * * * *